United States Patent [19]

Bolt et al.

[11] Patent Number: 4,730,026

[45] Date of Patent: Mar. 8, 1988

[54] CROSS-LINKED ORGANOSILAZANE POLYMERS

[75] Inventors: John D. Bolt, Landenberg, Pa.; Frederick N. Tebbe, Hockessin, Del.

[73] Assignee: E. I. Du Pont de Nemours and Company, Wilmington, Del.

[21] Appl. No.: 913,405

[22] Filed: Sep. 30, 1986

[51] Int. Cl.[4] .............................................. C08F 283/00
[52] U.S. Cl. ...................................... 525/475; 528/25; 528/30; 501/97
[58] Field of Search .................... 525/475; 528/25, 30; 501/97

[56] References Cited

U.S. PATENT DOCUMENTS

| | | | |
|---|---|---|---|
| 3,853,567 | 12/1974 | Verbeek | 106/44 |
| 3,892,583 | 7/1975 | Winter et al. | 106/55 |
| 4,482,669 | 11/1984 | Seyferth et al. | 524/442 |
| 4,482,689 | 11/1984 | Haluska | 528/25 |
| 4,535,007 | 8/1985 | Cannady | 525/475 |
| 4,543,344 | 9/1985 | Cannady | 501/92 |

OTHER PUBLICATIONS

NASA Technical Memorandum–86505, (Mar. 1985), Penn et al.
Journal of Applied Polymer Science, 27:3751 (1982), Penn et al.

Primary Examiner—Melvyn I. Marquis

[57] ABSTRACT

Cross-linked organosilazane polymers which are useful as ceramic precursors and film casting are disclosed.

26 Claims, No Drawings

CROSS-LINKED ORGANOSILAZANE POLYMERS

FIELD OF THE INVENTION

The present invention relates to organosilazane polymers, and more specifically, cross-linked organosilazane polymers which are useful for preparing ceramics and polymeric gels.

BACKGROUND OF THE INVENTION

Organosilazane polymers decompose at elevated temperatures to form ceramic materials of silicon nitride, silicon carbide, and mixtures thereof. These ceramic materials are of considerable commercial interest because of their desirable properties at elevated temperatures. Problems associated with the use of organosilazane polymers as ceramic precursors include depolymerization during pyrolysis which results in low ceramic yields and the production of volatile reaction products. Methods for inhibiting such depolymerization and increasing ceramic yields are desirable to those in the ceramic field.

U.S. Pat. No. 4,482,669 discloses an organosilazane polymer which is useful for making $Si_3N_4/SiC$ ceramics. The polymer comprises a plurality of cyclic and/or linear precursor residues linked together by $Si_2N_2$ bridges. The polymer is made by reacting an organodihalosilane with ammonia to form an ammonolysis product, and treating the ammonolysis product with a basic catalyst capable of deprotonating an NH group that is adjacent to an SiH group. The polymer is preferably further treated with an electrophilic reagent.

U.S. Pat. No. 4,543,344 discloses a process for preparing $R_3SiNH$-containing hydrosilazane polymer by contacting and reacting trichlorosilane with a disilazane $(R_3Si)_2NH$ where R is vinyl, hydrogen, phenyl, or alkyl radicals containing 1 to 3 carbon atoms. U.S. Pat. No. 4,482,689 discloses a process for preparing $R_3'SiNH$-containing metallosilazane polymer containing boron, titanium, or phosphorous by contacting and reacting chlorine-containing disilanes and certain reactive metal halides with $[R_3'Si]_2NH$ where R' is vinyl, hydrogen, or alkyl radical of 1-3 carbon atoms, or phenyl.

U.S. Pat. No. 3,853,567 discloses production of shaped articles such as a fiber of homogeneous mixtures of silicon carbide and nitride. The articles are produced by pyrolyzing at about 200° C. to 800° C. a silazane to produce a fusible carbosilazane resin, forming the resin into fiber and heating the fiber in an inert atmosphere to about 800° C. to 2,000° C. U.S. Pat. No. 3,892,583 discloses production of shaped articles of silicon carbide and silicon nitride. A melt or solution of a silazane is formed into a shaped article by molding or melt or dry extrusion and is thereafter heated in an inert atmosphere to about 800° C. to 2000° C. to decompose the silazane into a homogeneous mixture of silicon carbide and silicon nitride. The silazane is produced by reacting ammonia with a halogenosilane and, if effected in solution, after removal of by-product ammonia chloride and optionally concentrating, the solution is directly employed for shaping.

Penn et al., *NASA Technical Memorandum*-86505, (March, 1985) discloses preparation of silicon carbide-silicon nitride fibers ($SiC-Si_3N_4$) by the pyrolysis of polycarbosilazane precursors. Penn et al., *Journal of Applied Polymer Science,* 27:3751 (1982) discloses preparation of silicon carbide-silicon nitride fibers ($Si_xN_yC_z$) by the pyrolysis of polycarbosilazanes prepared from tris(N-methylamino)methylsilane.

SUMMARY OF THE INVENTION

The present invention provides a polymer comprising a plurality of precursor residues comprising repeat units of the formula

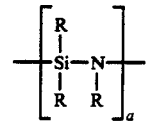

said precursor residues being linked together by at least one bridge of the formula $-MR'_n-$; said bridge or bridges being attached to nitrogen atoms of the repeat units wherein the formulas R is independently selected from the group consisting of hydrogen, alkyl groups having from 1 to 6 carbon atoms, substituted and unsubstituted phenyl groups, substituted and unsubstituted napthyl groups, substituted and unsubstituted biphenyl groups, substituted and unsubstituted allyl groups, substituted and unsubstituted alkylaryl groups having from 7 to 18 carbon atoms, substituted or unsubstituted aryl groups having from 6 to about 12 carbon atoms, and substituted and unsubstituted vinyl groups;

R' is independently selected from the group consisting of hydrogen, lower alkyl groups having from 1 to about 6 carbon atoms provided that the alkyl group has no $\beta$-hydrogen atoms when M is Ti, Zr, or Hf, and mono- and di- aryl- or alkylamino, alkylphenyl, and alkylaryl groups;

M is a metal independently selected from Groups IIIA, IIB, IVB and IIA of the Periodic Table, provided that M is not Hg;

n is an integer less than or equal to the valence of M; and a is an integer greater than 1.

The present invention also provides processes for preparing the specified polymer and for preparing ceramic materials from the polymer. Polymer of the present invention can be in the form of solids, viscous liquids or polymeric gels which are useful for film casting.

DETAILED DESCRIPTION OF THE INVENTION

The present invention provides polymer which is useful for making various ceramic products. Cross-links in the polymer inhibit depolymerization during pyrolysis to generate high ceramic yields. Gels of the present polymer are useful for film casting.

The polymers of the present invention are prepared by contacting a plurality of precursor residues comprising repeat units of the formula

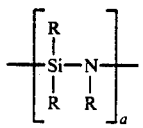

wherein R and a are as defined above, with a metallic reagent of the formula $MR'_x$ wherein M and R' are as defined above and x is the valence of M. Suitable metallic reagents are capable of bonding, or alternatively deprotonating and bonding, nitrogens of the repeat units. Preferably, R is independently selected from the group consisting of —H, —$C_yH_{2y+1}$, —$C_6Y_5$, —$C_{10}Y_7$, —$C_{12}Y_9$, —$CY_2CY$=$CY_2$, —$QC_6Y_5$, —$QC_{12}Y_7$, —$QC_{12}Y_9$, and —$CY$=$CY_2$; wherein Y is independently selected from the group consisting of H, F, Cl, Br, and $C_yH_{2y+1}$; Q is $C_yH_{2y}$; and y is an integer from 1 to 6, inclusive. Most preferably, R is independently selected from the group consisting of —H, —$C_yH_{2y+1}$, —$C_6Y_5$, and —$QC_6Y_5$. In the present invention, M is a metal independently selected from Groups IIIA, IIB, IVB and IIA of the Periodic Table. As used herein, "Periodic Table" refers to the CAS version. Preferably, M is independently selected from the group consisting of B, Al, Zn, Cd, Ti, Zr, and Mg. Preferably, R' is independently selected from the group consisting of —H, —$C_yH_{2y+1}$, $C_6Y_5$, —$C_{10}Y_7$, —$C_{12}Y_9$, —$ZC_6Y_5$, —$NL_2$, and —NHL; wherein Y and y are as defined above; Z is $C_yH_{2y}$; L is $C_yH_{2y+1}$, $C_6Y_5$, $C_{10}Y_7$, $C_{12}Y_9$, and $QC_6Y_5$ wherein Q is as defined above; and provided that $C_yH_{2y+1}$ (in R') and Z have no β-hydrogen atoms when M is Ti, Zr and Hf. Most preferably, R' is independently selected from the group consisting of —H or $C_yH_{2y+1}$. Most preferably, the metallic reagent is selected from the group consisting of $BH_3$, $BEt_3$, $AlEt_3$, $AlMe_3$, $ZnEt_2$, $MgBu_2$, $Ti(Net_2)_4$, and $Zr(CH_2C(CH_3)_2C_6H_5)_4$.

Suitable solvents for preparing the present polymer comprise halogenated compounds such as methylene chloride; dialkyl ethers such as diethyl ether; cyclic ethers such as tetrahydrofuran, tetrahydropyran and 1,4-dioxane; aliphatic hydrocarbons such as pentane and hexane; and aromatic hydrocarbons such as benzene, toluene and xylene. Preferably, the molar ratio of the metallic reagent, $MR'_x$, to Si in the precursor residues is from about 0.001 to about 0.20 and the reaction temperature is from about −40° to about 200° C. The present polymer can also be prepared without a solvent if the precursor residues are in the liquid or solid phase and the metallic reagent is in the liquid or gas phase.

The present polymer is useful for preparing shaped ceramic articles, such as fibers, films, and coatings. The polymer is also useful for preparing binders for ceramic powders and as a matrix for ceramic fibers. Ceramic articles are formed by heating polymer of the present invention at a temperature greater than about 350° C. in an inert atmosphere such as nitrogen or a reactive atmosphere such as ammonia.

The invention is further defined in the following examples wherein all parts and percentages are by weight and degrees are Celcius unless otherwise stated. Poly(1,1-dimethylsilazane) and (1,2-dimethylsilazane)-(1-methylsilazane) copolymers used in the Examples are commercially available from Petrarch Systems, Incorporated, Bristol, Pennsylvania. Poly(1,1-dimethylsilazane) is described as a polymer with viscosity >1000 ctsk and (1,2-dimethylsilazane)(1-methylsilazane) is described as a copolymer with a density of 1.01 and a viscosity of 150–300 ctsk. In the Examples, cross-linked polymers were prepared under vacuum or an atmosphere of nitrogen.

EXAMPLE 1 AND COMPARATIVE EXPERIMENT A

Preparation of Ceramic Material from Cross-linked Poly(1,1-Dimethylsilazane)

A. Preparation of Cross-linked Poly(1,1-Dimethylsilazane)

A solution containing 1.54 g of poly(1,1-dimethylsilazane) and 11 mL of methylene chloride was placed into a small reaction vessel. To this was added with stirring 0.9 mL of 1 M $Al(C_2H_5)_3$ in hexane to form a reaction mixture. There appeared to be a very slow evolution of gas. The reaction was allowed to continue for one hour at ambient temperature. The solvent was removed by evaporation under reduced pressure while the temperature of the reaction mixture was maintained slightly above ambient temperature to recover the resulting cross-linked polymer.

B. Preparation of Ceramic Material

A small sample of the cross-linked poly(1,1-dimethylsilazane) prepared in A above was pyrolyzed by heating to 850° [thermogravimetric analysis in a nitrogen atmosphere]. The ceramic yield was 15.3%. Pyrolysis of uncrosslinked poly(1,1-dimethylsilazane) gave a 0.4% ceramic yield.

EXAMPLE 2 AND COMPARATIVE EXPERIMENT B

Preparation of Ceramic Material from Cross-linked (1,2-Dimethylsilazane)(1-Methylsilazane) Copolymer

A. Preparation of Cross-linked (1,2-Dimethylsilazane)-(1-Methylsilazane) Copolymer A solution containing 1.71 g of (1,2-dimethylsilazane)(1-methylsilazane) copolymer and 12 mL of methylene chloride was placed into a small reaction vessel. To this was added with stirring 1.0 mL of 1M $Al(C_2H_5)_3$ in hexane to form a reaction mixture. Gas was evolved from the mixture. The reaction was allowed to continue for one hour at ambient temperature. The solvent was removed by evaporation under reduced pressure while the temperature of the reaction mixture was maintained slightly above ambient temperature to recover the resulting cross-linked polymer. The cross-linked polymer was like the starting polymer, a viscous fluid.

B. Preparation of Ceramic Material

A small sample of cross-linked (1,2-dimethylsilazane)(1-methylsilazane) copolymer prepared in A above was pyrolyzed at 850° [thermogravimetric analysis in a nitrogen atmosphere]. The ceramic yield was 71.4%. Pyrolysis of uncross-linked (1,2-dimethylsilazane)(1-methylsilazane) copolymer gave a 40.3% ceramic yield.

EXAMPLES 3-14

Preparation of Polymeric Gels of Cross-linked Polymer

An organosilazane polymer similar to that described in U.S. Pat. No. 4,482,669 was prepared according to the following procedure. First, a mixture of cyclic methylsilazanes was prepared by ammonolysis of dichloromethyl silane under nitrogen. 96.1 g of dichloromethylsilane in 600 mL of tetrahydrofuran (THF) were cooled to 0° in a 1 L flask with a dry ice-acetone condenser. Ammonia was bubbled into the resulting solution at a rate of 6 mL/sec for 4 hours with stirring. Excess ammonia was allowed to escape on warming the solution to ambient temperature. Ammonium chloride was removed from the solution by filtration and washed with THF. The resulting filtrates were combined and the resulting mixture was evaporated under vacuum to yield 44.8 g (89% yield) of a cyclic methylsilazane mixture as a liquid. $^1$H NMR (360 MHz, CD$_2$Cl$_2$) δ0.15–0.25 (multiplet, 3H, SiCH$_3$); 0.93 (broad, 0.9 H, NH); 4.35–5.0 (multiplet, 0.9 H, SiH).

The cyclic methylsilazane mixture was polymerized by coupling with potassium hydride (KH). In a nitrogen filled drybox, 0.2 g of KH was suspended in 300 mL of THF. 31 g of the cyclic methylsilazane mixture prepared above were added to the KH suspension over a period of about 25 min. and stirring was continued for 4 hours. 0.5 mL of methyliodide was added to quench the resulting mixture. Most of the THF was removed by evaporation under vacuum and 125 mL of hexane were added to the resulting slurry. Potassium iodide was then removed from the slurry and the remaining solvent was removed under vacuum to give 28.6 g of a brittle solid white polymer, designated "KH polymerized silazane" herein. $^1$H NMR (360 MHz, CD$_2$Cl$_2$) δ 0.32 (broad, 3H, SiCH$_3$); 0.9 (broad, 0.4 H, NH); 2.48 (broad, 0.02 H, NCH$_3$); 4.78 (broad, 0.4 H, SiH).

Specified amounts of the polymer were dissolved in methylene chloride or toluene followed by addition of the organometallic cross-linking reagent as shown in Table 1. The reactions were allowed to proceed at ambient temperature or at reflux for short periods of time followed by subsequent reaction at ambient temperature. The criterion used to determine cross-linking was gelation of the reaction mixture. The results are listed in Table 1, wherein "Ratio" refers to the molar ratio of Si to metallic reagent based on a repeat unit molecular weight of 59 for [CH$_3$SiHNH].

gas was essentially complete, the resulting cross-linked polymer was examined by $^1$H NMR (360 MHz). The ratio of SiCH$_3$ (δ0.29, broad, 3 H, SiCH$_3$) to SiH (δ 4.45–4.93, multiplet, broad, 0.9 H, SiH) in the cross-linked polymer prepared in this Example was the same as that determined for the cyclic methylsilazane mixture. The resonance assigned to NH protons of the cross-linked polymer of this Example (δ 0.94, broad, 0.15 H, NH) was significantly less than that in the cyclic methylsilazane mixture.

EXAMPLE 16

Preparation of Cross-linked Polymer from KH Polymerized Silazane

A 0.1 g portion of the KH polymerized silazane prepared in Examples 3–14 was mixed with 0.06 g of Al(CH$_3$)$_3$ in 1.6 g of CD$_2$Cl$_2$. After a hour at ambient temperature, the viscosity of the resulting mixture had increased. The mixture was diluted with 1.6 g of CD$_2$Cl$_2$ and examined by 1H NMR (360 MHz) before solids precipitated. The ratio of SiCH$_3$ (δ0.42, broad, 3 H, SiCH$_3$) to SiH (δ4.88, broad, 0.4 H, SiH) in the cross-linked polymer prepared in this Example was the same as that determined for the KH cross-linked polymer. The NMR resonances assignable to NH protons were not present in the spectrum of the cross-linked polymer of this Example.

EXAMPLE 17

Preparation of Ceramic Materials from Cross-linked (1,2-Dimethylsilazane)(1-Methylsilazane) Copolymer A. Preparation of Cross-linked (1,2-Dimethylsilazane)(1-Methylsilazane) Copolymer A solution containing 2.0 g of (1,2-dimethylsilazane)(1-methylsilazane) copolymer and 10 mL of methylene chloride was placed into a small reaction

TABLE 1

| | | | Preparation of Polymeric Gels of Cross-linked Polymer | | | |
|---|---|---|---|---|---|---|
| Polymer | Solvent | Amount | Reagent | Amount | Ratio | Observations |
| 2.00 g | Toluene | 10.0 mL | AlEt$_3$ | 0.210 g | 18 | Gels within 3 hrs |
| 2.00 g | CH$_2$Cl$_2$ | 10.0 mL | AlEt$_3$ | 0.210 g | 18 | Gels within 2 hrs |
| 1.03 g | CH$_2$Cl$_2$ | 5.0 mL | ZnEt$_2$ | 0.110 g | 18 | Gels within 2 hrs |
| 1.00 g | CH$_2$Cl$_2$ | 5.0 mL | BH$_3$ | 1 mL/1 M | 17 | Gels within 30 min |
| 0.50 g | CH$_2$Cl$_2$ | 2.5 mL | AlPh$_3$ | 0.120 g | 18 | Gels within 2 hrs |
| 0.50 g | Toluene | 2.5 mL | AlH$_3$/ 1/3Et$_2$O | 0.050 g | 9 | Gels within 20 min |
| 0.50 g | CH$_2$Cl$_2$ | 2.5 mL | Zr(X)$_4$ | 0.160 g | 33 | Gels immediately |
| 0.50 g | Toluene | 5.0 mL | Zr(X)$_4$ | 0.022 g | 242 | Gels within 5 min |
| 0.50 g | Toluene | 2.5 mL | Ti(Y)$_4$ | 0.080 g | 36 | Refluxed 15 min. Gels after 2 days |
| 0.50 g | Toluene | 2.5 mL | AlEt$_2$H | 0.040 g | 17 | Gels immediately |
| 0.50 g | Toluene | 2.5 mL | BEt$_3$ | 0.050 g | 17 | Refluxed 5 min. Gels after 2 days |
| 0.50 g | Toluene | 2.5 mL | MgBu$_2$ | 0.048 g | 24 | Gels immediately |

AlEt$_3$ = Triethylaluminum
ZnEt$_2$ = Diethylzinc
BH$_3$ = BH$_3$.THF as a 1 M solution in THF
AlPh$_3$ = Triphenylaluminum
Zr(X)$_4$ = Zr(CH$_2$C(CH$_3$)$_2$C$_6$H$_5$)$_4$
Ti(Y)$_4$ = Ti(N(CH$_2$CH$_3$)$_2$)$_4$
AlEt$_2$H = Al(CH$_2$CH$_3$)$_2$H
BEt$_3$ = B(CH$_2$CH$_3$)$_3$
MgBu$_2$ = Mg(CH$_2$CH$_2$CH$_2$CH$_3$)$_2$

EXAMPLE 15

Preparation of Cross-linked Polymer from Cyclic Methylsilazane Mixture

A 0.1 g portion of the cyclic methylsilazane mixture prepared in Examples 3–14 was mixed with 0.02 g of Al(CH$_3$)$_3$ in 1.2 g of CD$_2$Cl$_2$. After the evolution of vessel. To this was added with stirring 1.1 mL of 1M Al(C$_2$H$_5$)$_3$ in hexane. About one-half of the resulting solution was dried by evaporation in an aluminum pan for about 18 hours and then heated on a hot plate. The resulting cross-linked polymer foamed to produce a rubbery mass.

B. Preparation of Ceramic Material

A small sample of cross-linked (1,2-dimethylsilazane)(1-methylsilazane) copolymer prepared in A above was pyrolyzed at 900° in an atmosphere of ammonia. The resulting ceramic product was white and in some areas off-white.

What is claimed is:

1. A polymer comprising a plurality of precursor residues comprising repeat units of the formula

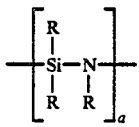

said precursor residues being linked together by at least one bridge of the formula $-MR'_n-$; said bridge or bridges being attached to nitrogen atoms of the repeat units wherein the formulas R is independently selected from the group consisting of hydrogen, alkyl groups having from 1 to 6 carbon atoms, substituted and unsubstituted phenyl groups, substituted and unsubstituted napthyl groups, substituted and unsubstituted biphenyl groups, substituted and unsubstituted allyl groups, substituted and unsubstituted alkylaryl groups having from 7 to 18 carbon atoms, and substituted and unsubstituted vinyl groups;

R' is independently selected from the group consisting of hydrogen, lower alkyl groups having from 1 to about 6 carbon atoms provided that the alkyl group has no β-hydrogen atoms when M is Ti, Zr, or Hf, and mono- and di- aryl- or alkylamino, alkylphenyl, and alkylaryl groups;

M is a metal independently selected from Groups IIIA, IIB, IVB and IIA of the Periodic Table, provided that M is not Hg;

n is an integer less than or equal to the valence of M; and a is an integer greater than 1.

2. A polymer of claim 1, wherein R is independently selected from the group consisting of $-H$, $-C_yH_{2y+1}$, $-C_6Y_5$, $-C_{10}Y_7$, $-C_{12}Y_9$, $-CY_2CY=CY_2$, $-QC_6Y_5$, $-QC_{10}Y_7$, $-QC_{12}Y_9$, and $-CY=CY_2$; wherein Y is independently selected from the group consisting of H, F, Cl, Br, and $C_yH_{2y+1}$; Q is $C_yH_{2y}$; and y is an integer from 1 to 6.

3. A polymer of claim 2, wherein R is independently selected from the group consisting of $-H$, $-C_yH_{2y+1}$, $-C_6Y_5$, and $-QC_6Y_5$.

4. A polymer of claim 2, wherein M is independently selected from the group consisting of B, Al, Zn, Cd, Ti, Zr, and Mg.

5. A polymer of claim 4, wherein R' is independently selected from the group consisting of $-H$, $-C_yH_{2y+1}$, $-C_6Y_5$, $-C_{10}Y_7$, $-C_{12}Y_{10}$, $-ZC_6Y_5$, $-NL_2$, $-NHL$; Z is $C_yH_{2y}$; L is $C_yH_{2y+1}$, $C_6Y_5$, $C_{10}Y_7$, $C_{12}Y_9$, or $QC_6Y_5$; and provided that $C_yH_{2y+1}$ in R' and Z have no β-hydrogen atoms when M is Ti, Zr or Hf.

6. A polymer of claim 5, wherein R' is independently selected from the group consisting of $-H$ and $C_yH_{2y+1}$.

7. A process for preparing a polymer comprising contacting a plurality of precursor residues comprising repeat units of the formula

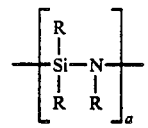

with a metallic reagent of the formula $MR'_x$, wherein the formulas

R is independently selected from the group consisting of hydrogen, alkyl groups having from 1 to 6 carbon atoms, substituted and unsubstituted phenyl groups, substituted and unsubstituted napthyl groups, substituted and unsubstituted biphenyl groups, substituted and unsubstituted allyl groups, substituted or unsubstituted aryl groups having from 6 to about 12 carbon atoms, and substituted and unsubstituted vinyl groups;

R' is independently selected from the group consisting of hydrogen, lower alkyl groups having from 1 to about 6 carbon atoms provided that the alkyl group has no β-hydrogen atoms when M is Ti, Zr, or Hf, and mono- and di-aryl- or alkylamino, alkylphenyl, and alkylaryl groups;

M is a metal independently selected from Groups IIIA, IIB, IVB or IIA of the Periodic Table, provided that M is not Hg;

x is an integer less than or equal to the valence of M; and a is an integer greater than 1.

8. A process as defined in claim 7, wherein R is independently selected from the group consisting of $-H$, $-C_yH_{2y+1}$, $-C_6Y_5$, $-C_{10}Y_7$, $-C_{12}Y_9$, $-CY_2CY=CY_2$, $-QC_6Y_5$, $-QC_{10}Y_7$, $-QC_{12}Y_9$, and $-CY=CY_2$; wherein Y is independently selected from the group consisting of H, F, Cl, Br, and $C_yH_{2y+1}$; Q is $C_yH_{2y}$; and y is an integer from 1 to 6.

9. A process as defined in claim 8, wherein R is independently selected from the group consisting of $-H$, $-C_yH_{2y+1}$, $-C_6Y_5$, and $-QC_6Y_5$.

10. A process as defined in claim 9, wherein M is independently selected from the group consisting of B, Al, Zn, Cd, Ti, Zr, and Mg.

11. A process as defined in claim 10, wherein R' is independently selected from the group consisting of $-H$, $-C_yH_{2y+1}$, $-C_6Y_5$, $-C_{10}Y_7$, $-C_{12}Y_9$, $-ZC_6Y_5$, $-NL_2$, and $-NHL$; Z is $C_yH_{2y}$; L is $C_yH_{2y+1}$, $C_6Y_5$, $C_{10}Y_7$, $C_{12}Y_9$, or $QC_6Y_5$; and provided that $C_yH_{2y+1}$ in R' and Z have no ε-hydrogen atoms when M is Ti, Zr and Hf.

12. A process as defined in claim 11, wherein R' is independently selected from the group consisting of $-H$ and $C_yH_{2y+1}$.

13. A process as defined in claim 7, wherein the metallic reagent is selected from the group consisting of $BH_3$, $BEt_3$, $AlEt_3$, $AlMe_3$, $ZnEt_2$, $MgBu_2$, $Ti(NEt_2)_4$, and $Zr(CH_2C(CH_3)_2C_6H_5)_4$.

14. A polymer prepared by the process defined in claim 7.

15. A polymer prepared by the process defined in claim 8.

16. A polymer prepared by the process defined in claim 9.

17. A polymer prepared by the process defined in claim 10.

18. A polymer prepared by the process defined in claim 11.

19. A polymer prepared by the process defined in claim 12.

20. A polymer prepared by the process defined in claim 13.

21. A ceramic material prepared by heating the polymer of claim 1.

22. A ceramic material prepared by heating the polymer of claim 2.

23. A ceramic material prepared by heating the polymer of claim 3.

24. A ceramic material prepared by heating the polymer of claim 4.

25. A ceramic material prepared by heating the polymer of claim 5.

26. A ceramic material prepared by heating the polymer of claim 6.

* * * * *